Aug. 4, 1959  T. L. FAWICK  2,897,924
ACTUATING DIAPHRAGM AND WEAR-SHOE ASSEMBLY
FOR FLUID-ACTUATED CLUTCHES AND BRAKES
Filed March 9, 1955
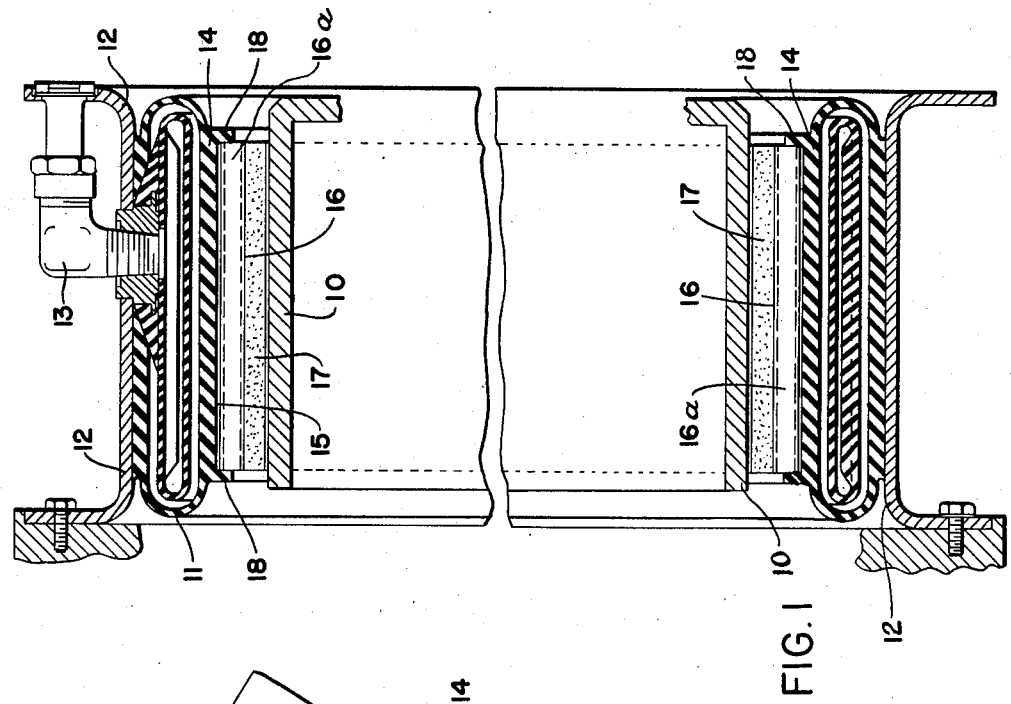
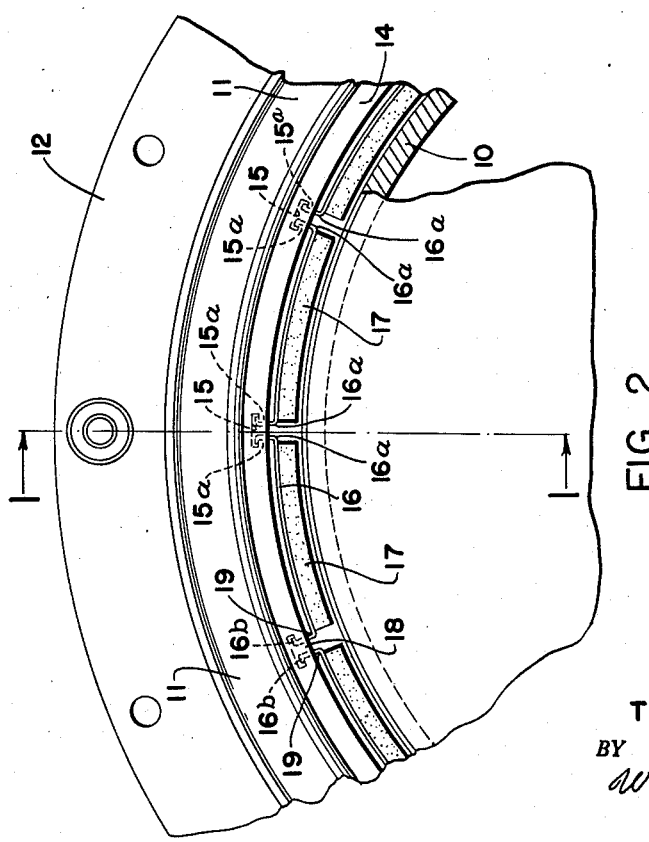
*INVENTOR.*
THOMAS L. FAWICK
BY *Willard D. Eakin*
ATTORNEY

United States Patent Office 2,897,924
Patented Aug. 4, 1959

2,897,924

ACTUATING DIAPHRAGM AND WEAR-SHOE ASSEMBLY FOR FLUID-ACTUATED CLUTCHES AND BRAKES

Thomas L. Fawick, Cleveland, Ohio, assignor to Fawick Corporation, a corporation of Michigan Application March 9, 1955, Serial No. 493,117

2 Claims. (Cl. 188—152)

This invention relates to clutches and brakes in which circumferentially arranged wear shoes are mounted upon the surface of a diaphragm member and are moved into frictional engagement with a drum by pressure-fluid distension of the diaphragm; and it more particularly relates to a manner of interlocking the wear shoes with material of the diaphragm for preventing circumferential, radial or axial displacement of the wear shoes in relation to the diaphragm.

Its chief objects are to provide in an improved manner for such interlocked relationship of the wear shoes to the diaphragm, and especially with economy of construction and with security and stability of the anchorage of the shoes to the diaphragm.

Of the accompanying drawings:

Fig. 1 is an axial section, on line 1—1 of Fig. 2, of a clutch drum or brake drum, a diaphragm and its mounting, and a set of wear shoes mounted upon the diaphragm, this assembly of elements embodying my invention in its preferred form as applied to a clutch or a brake of the constricting type.

Fig. 2 is a fragmentary elevation of the assembly shown in Fig. 1.

In this particular embodiment the drum is shown at 10 and is surrounded by a hollow annular diaphragm or bag 11 of cord-reinforced rubber. The outer peripheral face of the bag is secured as by vulcanization to a metal ring 12 as the mounting of the bag and an inlet-outlet pipe 13 is provided for charging and venting the bag.

The inner peripheral wall of the bag comprises a thick surface layer of rubber 14 and the face thereof nearest the drum 10 is formed with a circumferentially spaced set of axially extensive shoe-anchoring recesses 15, 15.

Each of these recesses, as it would be viewed in cross-section, from an axial direction as in Fig. 2, is of T shape, the head of the T being at the outer end of the stem of the T, thus being the deepest part of the recess and defining a pair of overhang ribs 15a, 15a for interlocking, against relative circumferential and radial movement, with respective hooked end flanges 16a, 16a on sheet-metal base plates 16 having respective blocks of friction material 17, 17 secured as by vulcanized adhesion to their radially inner faces, for frictional engagement with the drum 10.

To prevent axial displacement or escape of the shoes in relation to the bag the thick inner peripheral rubber layer of the bag is integrally formed with a web of rubber 18, 18 at each end of each recess 15, as a stop or retaining element, and the length of each end flange 16a of each base plate 16 is such that it snugly fits between its embracing pair of retaining elements 18, 18.

The main body portions of the base plates 16 are arcuately curved to fit the cylindrically concave, shoe-receiving areas of the inner peripheral face of the diaphragm, with at least as much snugness at the ends of the shoe as at its middle portion, for avoidance of rocking of the shoe by its sustension of the torque. The other dimensions are such as to provide a firm grip of the hooked end portions 16a of the base plates with their anchoring ribs 15a, 15a.

Each wear-shoe assembly is adapted to be mounted by first engaging one of its hooks 16a with its rubber rib 15a, which can easily be done by employing an oblique position and hooking movement of the shoe assembly, and then, by a radially outward hinging movement of the shoe assembly, snapping the other hook into place, which can easily be done because of the resiliently deformable character of the rubber.

Preferably the interfitting surfaces are slightly rounded, as at 19, 19, Fig. 2, for facility of snapping the last-engaged one of the base plate hooks radially onto its rubber rib 15a of the diaphragm, and preferably the terminal element 16b of each hook is formed with a slightly oblique or beveled face on its side toward the rib 15a, for facilitating the disengaging of the first disengaged hook of the base plate from its rubber rib 15a, in dismounting of the shoe by reversal of the above described procedure for mounting it.

The invention is especially well adapted for clutches of the constricting type, in which centrifugal force of the shoe assemblies only seats them more firmly against the diaphragm, without any tendency to unhook the end flanges of their base plates.

The interlocking of the shoe assembly in direct contact with the resilient and frictional rubber of the diaphragm against both circumferential and radial displacement provides a permanent resilient engagement and avoids the development of looseness and wear and possible dislodgement of the shoe assembly.

Modifications are possible within the scope of the invention as defined in the appended claims.

I claim:

1. A diaphragm and wear-shoe assembly comprising a fluid-distensible annular diaphragm formed with a circumferentially spaced set of wear-shoe-anchoring recesses defined by walls of rubber having interlock portions, the rubber being continuous from each recess to the next, and a set of wear-shoe assemblies, each of said wear-shoe assemblies comprising interlock means at its positions of termination circumferentially of the assembly and directly interlocked with the interlock portions of the said recess-defining walls of rubber of respective ones of the said recesses against both circumferential and radial movement of the wear-shoe assembly in relation to the said diaphragm, the defined interlock portions of the recess-defining walls of rubber comprising as to each of the recesses an element of the diaphragm interlocked in direct contact with interlock means of the wear-shoe assembly against axial movement of the wear-shoe assembly in relation to the diaphragm, and material of the diaphragm being confined circumferentially and radially by direct contact of elements of the single wear-shoe assembly.

2. An assembly as defined in claim 1 in which each of the defined recesses is of T shape in cross-section and the interlock means of each wear-shoe assembly is a pair of hooks at the respective ends of the said wear-shoe assembly, the said hooks facing each other for interlocking engagement in respective ones of the said recesses, with the said hooks directly contacting the walls of rubber defining the respective recesses.

References Cited in the file of this patent

UNITED STATES PATENTS

| | | |
|---|---|---|
| 1,537,233 | Hartman | May 12, 1925 |
| 2,252,128 | Kraft | Aug. 13, 1941 |
| 2,630,198 | Kraft | Mar. 3, 1953 |
| 2,637,345 | Kraft | May 5, 1953 |
| 2,637,427 | Kraft | May 5, 1953 |